United States Patent [19]
Engle

[11] 3,840,363
[45] Oct. 8, 1974

[54] FLUIDIZATION OF PARTICULATE SOLIDS
[75] Inventor: Theodore M. Engle, Abingdon, Va.
[73] Assignee: Hydrocarbon Research, Inc., New York, N.Y.
[22] Filed: May 12, 1972
[21] Appl. No.: 252,878

Related U.S. Application Data
[63] Continuation of Ser. No. 10,898, Feb. 12, 1970, abandoned.

[52] U.S. Cl. .................................. 75/26, 75/34
[51] Int. Cl. ................................. C21b 1/02
[58] Field of Search .......................... 75/26, 34

[56] References Cited
UNITED STATES PATENTS

| | | | |
|---|---|---|---|
| 2,481,217 | 9/1949 | Hemminger | 75/26 |
| 2,957,757 | 10/1960 | Coates | 75/26 |
| 2,995,426 | 8/1961 | Keith | 75/26 |
| 3,154,405 | 10/1964 | Engle | 75/26 |
| 3,224,869 | 12/1965 | Keith | 75/26 |
| 3,224,870 | 12/1965 | Johnson | 75/26 |
| 3,442,028 | 5/1969 | Bergougnov | 75/26 |

*Primary Examiner*—Charles N. Lovell
*Assistant Examiner*—Peter D. Rosenberg

[57] ABSTRACT

In fluidized, multi-bed processes such as the fluidized reduction of iron oxide ores, the periodic discharge of particles from bed to bed is facilitated by the supplemental flow of gas through the beds to thereby maintain fluidization.

4 Claims, 5 Drawing Figures

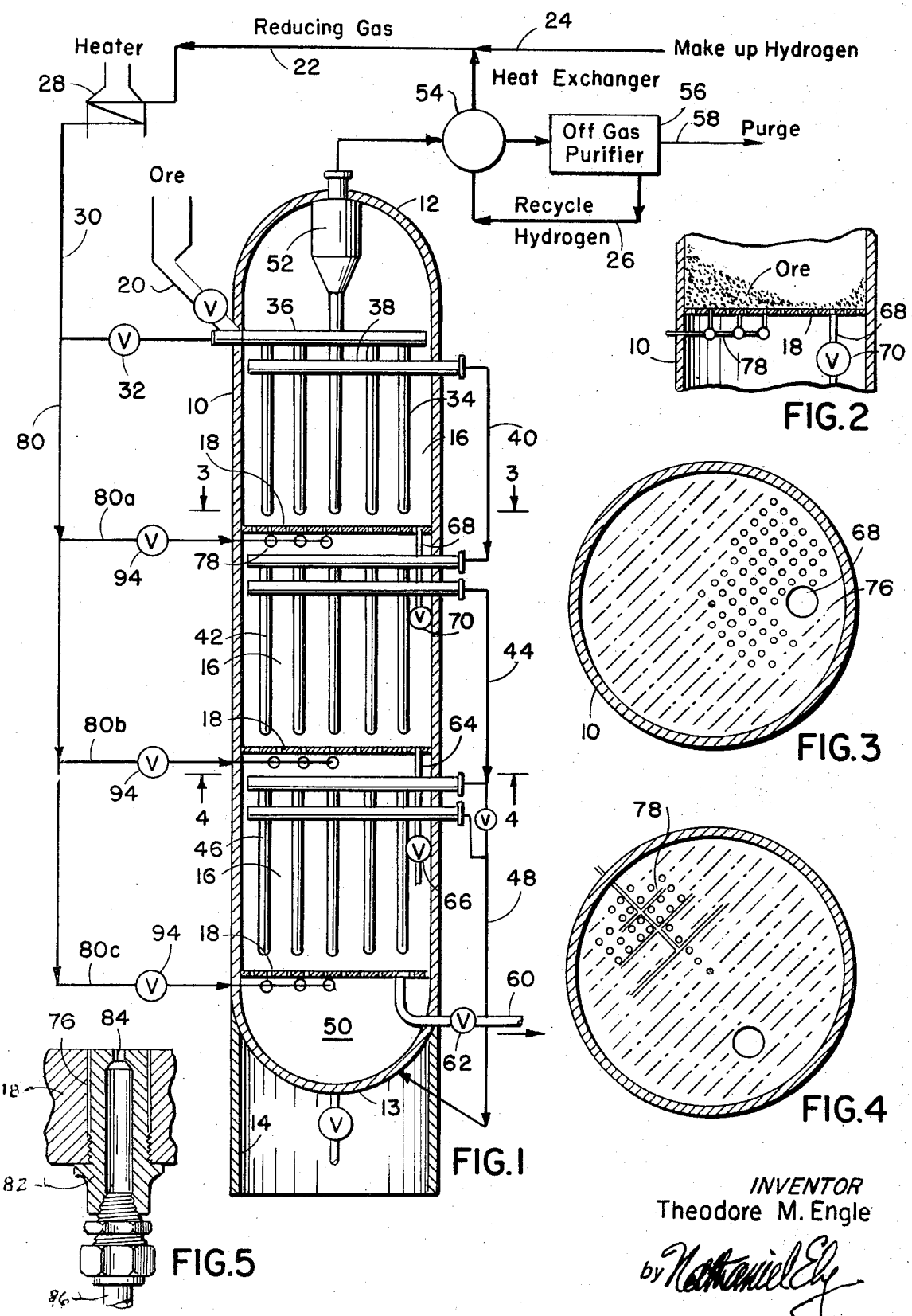

3,840,363

FLUIDIZATION OF PARTICULATE SOLIDS

This is a continuation, of application Ser. No. 10,898, filed Feb. 12, 1970, and now abandoned.

BACKGROUND OF THE INVENTION

In U. S. Pat. No. 3,154,405 in which I am one of the inventors, a process is described for the reduction of iron oxide ore to produce substantially pure metal by the use of a multiple bed reactor through which a reducing gas passes from the bottom to the top to sequentially remove the oxides present. The reducing gas passes slowly through the beds to maintain fluidization and reduction for a limited period of time after which the gas flow is discontinued and the ore in the lowermost bed is removed from the reactor. The upper beds then move downward by gravity, an intermediate bed moving to a lower bed, each in turn. The termination of gas flow and opening of the appropriate downpipe establishes a flow of particles of ore from each bed into the downpipe. However in any time cycle a relatively deep bed of particles remains on the deck at a point remote from the downpipe. As this part of the ore does not pass to the downpipe, a complete change of bed is not accomplished, and, in addition it is also found that after the downpipes are closed, the reducing gas passes upwardly through the new bed with but a relatively low efficiency of operation.

SUMMARY OF THE INVENTION

I now find that by the introduction of a supplemental gas directly to openings in the bed remote from the downpipe, in a multiple bed fluidization system, I can maintain continuous fluidization and prevent sloughing and thereby can obtain a more complete discharge during the discharge period. Ore-gas contacting, during the contacting period is also materially improved.

DESCRIPTION OF THE DRAWING

FIG. 1 is a vertical cross-sectional view of a reactor illustrating one form of the invention.

FIG. 2 is a vertical detail view of one stage of the reactor.

FIG. 3 is a section on line 3—3 of FIG. 1 looking down.

FIG. 4 is a section on line 4—4 of FIG. 1 looking up.

FIG. 5 is a detail vertical cross-section, on an enlarged scale of a deck with the nozzle shown in elevation.

DESCRIPTION OF THE PREFERRED EMBODIMENT

The reactor generally shown at 10 is preferably a cylindrical tower having a hemispherical top 12 and bottom 13; the bottom being supported on a cylindrical extension 14. This extension or skirt 14 is usually provided with access openings, not shown, and is of sufficient height to give the desired headroom under the bottom 13.

The reactor 10 is divided into a plurality of sections or beds herein designated at 16, which are established by the horizontal partitions or decks 18. Generally, there are at least two reaction zones and, preferably, three or four, and they serve to receive and hold the particulate solids such as iron ore which may be introduced to the top bed through inlet 20.

For the purpose of this invention the fluidizing gas is a reducing gas 22 consisting of make-up hydrogen at 24 and recycle hydrogen at 26. This is appropriately heated in heater 28 and introduced through line 30 and valve 32 to a series of U-tubes 34 in upper bed 16 such U tubes being interconnected to headers 36 and 38. The reducing gas then discharges by line 40 to a similar series of U-tubes 42 in the next lower bed. From this set of U-tubes, by line 44, the reducing gas then enters the lowermost U-tubes 46 and by line 48, the reducing gas discharges into the plenum chamber 50. A valve in line 44-48 controls the flow.

The reducing gas then passes upwardly through the perforations in the several decks 18 and ultimately discharges through the cyclone separator 52 and through heat exchanger 54 to the off gas purifier 56. A purge gas may be removed at 58 and the recycle hydrogen stream is removed at 26. Preferably this stream passes through heat exchanger 54 to the reducing gas line 22. This arrangement of gas flow is substantially in accordance with the Stotler U.S. Pat. No. 2,805,144 and permits desired heat exchange with the fluidized ore beds as well as utilizing U-tubes as baffles to maintain fluidity of the iron ore beds.

The upflow of reducing gas not only maintains the solids in the desired fluidized condition but simultaneously accomplishes a reduction of the oxides. The lowermost chamber having the most reduced particles receives the most pure hydrogen and the topmost bed accomplishes a reduction of the oxidized fresh feed. After a sufficient reaction is completed in the beds, the solids are removed from the lowermost bed through conduit 60 under control of valve 62.

In turn, the next above bed 16 is discharged through the downcomer 64 under control of the valve 66 and following this the uppermost bed will be discharged through its downcomer 68 under control of its valve 70. Thereafter, further solids are introduced to the top bed through the inlet 20.

In a process of this type a typical period of reduction is in the range of from 1 to 5 hours, and the sequence of valve openings is such that the solids which have been reacted are drawn off in a fraction of an hour. The time cycle is partially dependent on the minimum reaction period, and partially on the accumulated time for the separate bed discharges.

As shown in FIG. 2, is has been found that there is a tendency of the solids to form a cone with the downpipe 68 such that only a part of the total solids on the bed will pass through the downcomer in any period of time. This is due to the natural angle of slip of the solid particles one on the other.

It will be noted in FIG. 3, that downcomer 68 has a relatively larger opening than the other openings 76.

In accordance with my invention, I provide supplemental gas distributors generally indicated at 78 under the remote part of the decks 18 away from the downcomers 60, 64, and 68 and such distributors are connected with a separately controlled gas source 80 hereinafter discussed.

These distributors which may have different configurations are interconnected to only certain of the perforations 76 in the deck 18 so that there is an upward flow of reducing gas through a plurality of perforations in the decks at all times.

One example of connection is shown in FIG. 5 in which the deck 18, having perforations 76, is provided with a screw nozzle 82 having a restricted discharge outlet 84 with the stem 86 interconnected to the distributors 78.

As shown in FIG. 1, the supplemental gas source 80 is conveniently connected to the reducing gas line 30 and by separate lines 80a, 80b and 80c under control of valves 94 there is a continuous, although limited, flow of supplemental gas upward through the decks at all times.

In a system of this type by closing the valve 32 on the normal gas feed line 30 and opening the valve 62 on line 60 it is possible to accomplish a desired withdrawal of the lower bed at a much greater rate and with no hold up as the supplemental gas continues to fluidize the remote section of the decks. In a similar manner the other beds may be more rapidly discharged.

A typical gas-solids reaction for the reduction of metallic oxides such as iron ore with hydrogen, is carried out under preferred operating conditions as follows:

An ore such as magnetite, all of which passes a 20 mesh (USS) screen and at least 25 percent of which passes a 325 mesh screen is reduced with substantially pure hydrogen having a purity in the order of 95 percent by maintaining a reduction temperature of approximately 950°F and a pressure in the order of about 350 pounds per square inch gauge (PSIG). The superficial hydrogen velocity through the respective beds is about 1 foot per second, which maintains the solids in a uniform and quiescent fluidized condition. The fluidized beds have a density of about 100 pounds per cubic foot. The fresh hydrogen makeup gas feed as from a reformer may have as much as 2% to 3% of CO, but the recycle hydrogen contains only small percentages of other gases, such as methane and nitrogen and should have a moisture content of less than 0.1 mole percent.

Ranges of operating conditions are narrow within a temperature variation between 950° and 1,050°F and pressure variations in the range of 350 to 550 psig.

Reduced ore would normally be passed from bed to bed every 2 to 3 hours and the transfer lines for passing the ore from bed to bed for discharging the final product would be sized to permit substantially complete flow in about 10 to 15 minutes.

By this discovery, using a fixed size reactor it has been possible to increase daily reduction of a typical ore and hence throughput by in excess of 40 percent.

The disclosure of the invention with respect to the reduction of iron ore is a preferred embodiment of the invention. Other particulate materials for gas reaction or drying would also be effectively treated. While I have shown and described a preferred form of embodiment of my invention, I am aware that modifications within the scope and spirit of my invention can be made.

I claim:

1. The method of transferring particulate solids from a fluidized zone surmounting a perforated distributor through which a gas flows upwardly to a lower fluidized zone, similarly supported, against a continuously upflowing gas while avoiding hold-up of particles on the distributor; which comprises,
    a. opening a restricted orifice through the perforated distributor thereby forming a cone of solids having its apex at the orifice;
    b. simultaneously superimposing a separate gas stream directly and upwardly through other perforations in the distributor remote from the restricted orifice and directly under the remaining bed of solids;
    c. whereby fluidization of the solids remote from the restricted orifice is maintained thereby preventing sloughing and increasing the amount of solids which pass through the restricted orifice when open.

2. The method as claimed in claim 1 wherein the particulate solids are iron oxides, the transfer is accomplished at temperatures in the range of about 950 and 1050°F and under pressures in the range of about 350 to 550 psig, and the separate gas stream is hydrogen, and whereby the time cycle for the transfer of solids from one bed to another is partially dependent on the minumum reaction period, and partially on the accumulated time for the separate bed discharges so that the daily reduction of a typical ore is increased in excess of 40%.

3. An elongated, elevated reactor adapted to carry out a process wherein a first gasiform stream is passed upwardly through a plurality of dense fluidized beds of particulate solids comprising:
    a. a cylindrical shell;
    b. means to support said shell on a foundation;
    c. a plurality of vertically spaced perforated decks for supporting said beds;
    d. means to introduce said solids onto an upper deck;
    e. means to draw off said solids from the lowermost deck;
    f. means for introducing said first gasiform stream below the lowermost deck;
    g. means to remove said first gasiform stream from above the uppermost bed;
    h. conduit means to permit intermittent passage of said particulate solids from an upper bed to a lower bed through said decks;
    i. a supplemental gas distribution means connected at one end of said gas distribution means to said first gasiform stream and connected at the other end of said gas distribution means to said perforated decks at a point furthest from said conduit means to fluidize the solids which collect at said point thereby facilitating the passage of said solids from said upper deck to said lower deck;
    j. means to control said supplemental gas distribution means to maintain a positive flow of gas while passing said solids from said upper bed to said lower bed thereby minimizing the retention of said particulate solids on said decks while said particulate solids pass through said reactor.

4. An elongated, cylindrical reactor adapted to carry out a process wherein a gasiform stream is passed upwardly through a dense fluidized bed of particulate solids to establish a gas-solids contact which comprises:
    a. a perforated plate for supporting said bed;
    b. means to introduce said solids onto said plate;
    c. means to introduce a gas below said plate and to pass said gas through said perforations to fluidize said solids;
    d. a downcomer extending below said plate, said downcomer having a valve to permit intermittent passage of solids from above the plate to below the plate;

e. gas distribution means including nozzles interconnected to certain perforations in the plate remote from the downcomer and opening into said bed;

f. and valve means in said gas distribution means to control positive flow of gas through parts of the bed of solids remote from the downcomer to maintain fluidization and prevent sloughing during intermittent passage of solids through the downcomer.

* * * * *